(12) United States Patent
Xiao et al.

(10) Patent No.: US 8,271,806 B1
(45) Date of Patent: Sep. 18, 2012

(54) METHOD, SYSTEM AND DEVICE FOR COMMUNICATION BASED POWER SHARING

(75) Inventors: Browley Xiao, Shanghai (CN); Nelson Chow, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 950 days.

(21) Appl. No.: 11/688,832

(22) Filed: Mar. 20, 2007

(51) Int. Cl.
*G06F 1/00* (2006.01)

(52) U.S. Cl. ....................................... 713/300
(58) Field of Classification Search .................. 713/300
See application file for complete search history.

(56) References Cited

U.S. PATENT DOCUMENTS

| | | | |
|---|---|---|---|
| 5,675,480 A * | 10/1997 | Stanford | 307/58 |
| 5,914,585 A | 6/1999 | Grabon | |
| 6,243,818 B1 * | 6/2001 | Schwan et al. | 713/300 |
| 6,680,547 B1 | 1/2004 | Dailey | |
| 6,735,704 B1 * | 5/2004 | Butka et al. | 713/300 |
| 6,820,206 B1 | 11/2004 | Kim et al. | |
| 7,105,953 B2 | 9/2006 | Haas et al. | |
| 2003/0110403 A1 | 6/2003 | Crutchfield | |
| 2005/0187727 A1 * | 8/2005 | Weik et al. | 702/61 |
| 2005/0272402 A1 * | 12/2005 | Ferentz et al. | 455/402 |
| 2006/0112285 A1 * | 5/2006 | Stineman, Jr. | 713/300 |

* cited by examiner

*Primary Examiner* — Mohammed Rehman

(57) ABSTRACT

We describe an example system and method of power sharing that includes communicating a power status of each of a plurality of devices on a network to a rest of the plurality of devices connected to the network and sharing power between the plurality of devices responsive to the communicating.

15 Claims, 3 Drawing Sheets

METHOD, SYSTEM AND DEVICE FOR COMMUNICATION BASED POWER SHARING

TECHNICAL FIELD

The present disclosure relates generally to power sharing and, in particular, to power sharing based on communication.

BACKGROUND

Portable consumer electronic devices, e.g., laptops, digital cameras, cellular phones, MP3 players, and the like, are usually powered by batteries or an external power supply, e.g., an AC/DC adapter. In many instances, the batteries are rechargeable. The configuration of the external power supply usually depends on the type, brand, and model of the device. For example, a mobile phone charger may not be used to charge an MP3 player. Moreover, a charger of a particular brand or model of a mobile phone may not be used to power other mobile phone brands or models. No universal charger currently exists that can be used to power (or recharge) all devices.

SUMMARY

We describe an example method that comprises communicating a power status of each of a plurality of devices to a rest of the plurality of devices connected to a network and sharing power between the plurality of devices responsive to the communicating.

We describe an example system that comprises a first device that includes a first power storage device and a second device that includes a second power storage device. The second device may be configured to communicate a power status of the second device to the first device. The first device may be configured to provide power from the first storage device to the second storage device responsive to the power status of the second device and a power status of the first device.

We describe an example device that comprises a processor adapted to receive a power status of at least another device connected to a network, devise a power sharing strategy responsive to the power status of the at least another device and a power status of the device and share power with the at least another device connected to the network responsive to the power sharing strategy.

BRIEF DRAWINGS DESCRIPTION

DETAILED DESCRIPTION

Figure 1:
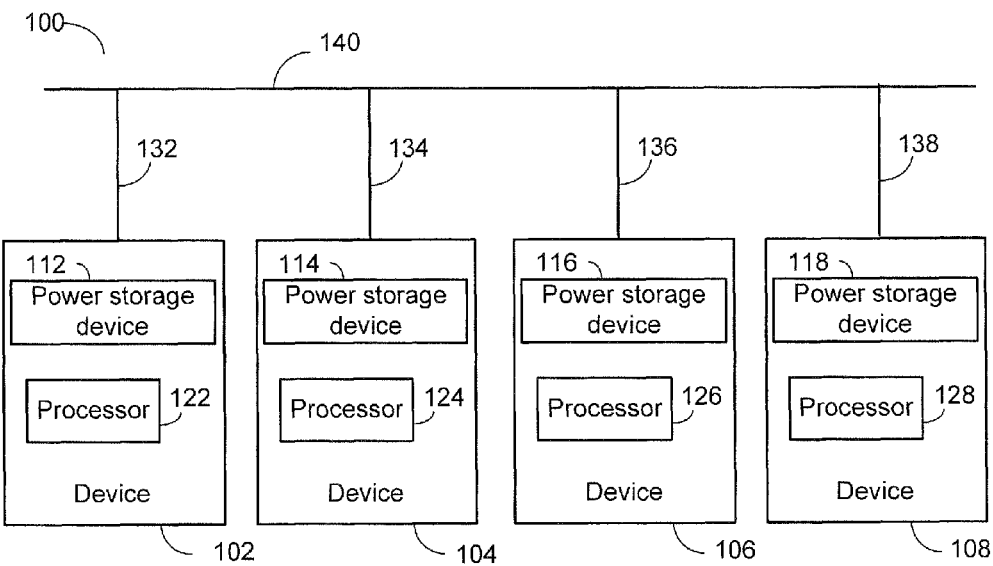
FIG. 1 illustrates an exemplary system including a plurality of devices.

As should be apparent to those skilled in the art from the following disclosure, the invention as we describe here may be embodied in many different forms and should not be construed as limited to the specific embodiments set forth. Rather, we provide these embodiments so that this disclosure will fully convey the principles and scope of the invention to those skilled in the art.

In the figures, the size of the boxes does not represent size of the various physical components. Where the same element appears in multiple figures, we use the same reference numeral to denote the element in all of the figures where it appears. When two elements operate differently, we use different reference numerals regardless of whether the two elements are the same class of device.

FIG. 1 illustrates an exemplary system 100 which includes a plurality of devices 102, 104, 106, and 108. The devices 102, 104, 106, and 108 may, for example, be different portable consumer electronic devices, e.g., laptop, cellular phone, MP3 player, digital camera, compact disc (CD) player, and the like. The number and the types of devices are exemplary in nature and the inventive principles are not limited to any particular number or type of devices.

The device 102 includes a power storage device 112. The power storage device 112 may store power and supply power to the device 102 while the device 102 is in operation. The power storage device 112 may be rechargeable and may be recharged periodically. The power storage device 112 may, for example, be a rechargeable battery or any other device capable of storing power. The devices 104, 106, and 108 include similar power storage devices 114, 116, and 118, respectively.

Each of the power storage devices 112, 114, 116, and 118 may be specifically designed for its respective device and have a power storage capacity based on the power rating or other requirements of its associated device 102, 104, 106, and 108. For example, if the devices 102 and 104 are a laptop and a cellular phone, respectively, then the power storage devices 112 and 114 may be rechargeable batteries suitable for a laptop and a cellular phone, respectively. A laptop may have a higher power requirement than a cellular phone and hence, the power storage device 112 may have a higher power storage capability than the power storage device 114. That is, the power storage device 112 may have a higher watt-hour (Wh) or milliamp-hour (mAh) rating than the power storage device 114.

Some or all of the power storage devices 112, 114, 116, and 118 may be similar. For example, if the devices 102 and 104 are a CD player and an MP3 player respectively, each of the power storage devices 112 and 114 may include one or more rechargeable AA or AAA batteries.

The devices 102, 104, 106, and 108 also include processors 122, 124, 126, and 128, respectively. The processor of a device may coordinate the operation of the device and its power storage device. Each processor may measure a charge level of its respective power storage device. The charge level of a power storage device may be an indication of the amount of power stored in the power storage device. Each processor may also control a recharging and use of the respective power storage device, as we explain in more detail below. For example, the processor 122 may coordinate the operation of the device 102 and the power storage device 112, measure the charge level of the power storage device 112, and control the recharging and use of the power storage device 112.

The devices 102, 104, 106, and 108 may be connected to a network 140 through links 132, 134, 136, and 138, respectively. The current rating of the links 132, 134, 136, and 138, i.e., the maximum amount of current the links may carry, may be based on the current rating of the respective devices 102, 104, 106, and 108. For example, if the devices 102 and 104 are a laptop and a cellular phone respectively, then the rating of the links 132 and 134 may be based on a current rating of the laptop 102 and the cellular phone 104 respectively. The link 132 may have a higher current rating than the link 134 as a laptop usually has a higher current rating than a cellular phone. Alternatively, all the links 132, 134, 136, and 138 may have substantially similar current rating, based on the device with the highest current rating. In an embodiment, the links 132, 134, 136, and 138 have substantially similar current rating and are interchangeable. That is, any one of the links 132, 134, 136, and 138 may be used to connect any of the devices 102, 104, 106, and 108 to the network 140. In another embodiment, at least two of the links have substantially similar current rating and are interchangeable.

The network 140 may be used to communicate signals and power among the devices 102, 104, 106, and 108. Each device may communicate a power status to other devices connected to the network 140. A power status of a device may include the status of one or more parameters of the device and its power storage device. The power status of a device 102, for example, may include the charge level of its power storage device 112. The power status of a device 104, for another example, may include the charge level of its power storage device 114, as well as other characteristics of the power storage device 114 like its current rating or a threshold power level below which the device 104 fails to operate.

When the charge level of a power storage device, e.g., storage device 114, falls below a certain charge level, the power storage device may require recharging. A power requirement of a power storage device may be the amount of power needed to recharge the power storage device to a certain threshold charge level. The power status of a device may also include a power requirement of the associated power storage device. For example, the power status of the device 102 may include the power requirement of the power storage device 112. The threshold charge level may be an indication of a minimum power necessary to operate the device 102 for certain duration of time. Alternatively, the threshold charge level may be a substantially full charge level of the power storage device 102. In yet another alternate arrangement, the threshold charge level may be any other charge level. The threshold charge level may be different for different devices connected to the network 140 and may be a configurable parameter, by a user or otherwise. It may also be adaptive in nature, depending on the availability of power. That is, if more power is available for recharging its power storage device, a device may increase its power requirement (i.e., increase its threshold charge level). And when the available power is sparse, the device may lower its power requirement (i.e., decrease its threshold charge level).

If the power storage device 112 of a device 102 is substantially fully charged or charged at least above a certain second threshold charge level, the power storage device 112 may provide spare power to other devices, e.g., devices 104, 106, and 108. That is, if a the power storage device 112 is charged more than a second threshold charge level, it may be willing to distribute some or all of the additional power to one or more of devices 104, 106, and 108, and their attendant storage devices 114, 116, and 118, connected to the network 140. For example, if the charge level of the power storage device 112 exceeds the second threshold charge level, then the device 102 may be willing to transmit some of its power to one or more of the devices 104, 106, and 108. The amount of power that a power storage device is willing to spare to any other device is an available power of the power storage device. The power status of a device may also include an available power of the associated power storage device. For example, the power status of the device 102 may include the available power of the power storage device 112. The available power, like the power requirement described above, may be device specific and configurable by a user or otherwise. The available power may also be adaptive and a device may vary its available power based on a power requirement of other devices connected to the network 140.

As disclosed above, the power status of a device may include a charge level, a power requirement and an available power of the device. The power status may, alternatively, include only one or two of these three parameters. The power status of a device may additionally include other parameters associated with the device. For example, the power status may also include a power rating of the device, a power consumption rate of the device, a power storage capacity of the associated power storage device, a configuration of the device and the power storage device, an importance of the device to the user (e.g., an user may consider a cellular phone to be more important than her MP3 player), any duration of time the user may want to operate the device, and the like. It should be apparent to those skilled in the art that the power status of a device may include some or all the above parameters or any other suitable parameter.

Referring to FIG. 1, each of the devices 102, 104, 106, and 108 may communicate their respective power status to the other devices connected to the network 140. Each device, thus, may be aware of its own power status and the power statuses of other devices connected to the network. For example, the device 102 may be aware of its own power status and may receive the power statuses of the devices 104, 106, and 108.

In an embodiment, a device may communicate its power status to at least one of the other devices in the network 140 using a link different from the link shown in FIG. 1 to connect the device to the network 140. For example, instead of using the link 132 and the network 140, the device 102 may communicate its power status to devices 104, 106, and 108 using some other means, e.g., through a wireless link.

Each of the processors 122, 124, 126, and 128 may devise a power sharing strategy for its respective device based on the power status of other devices. For example, the processor 122 may be aware of the power status of the device 102 and may receive the power status of devices 104, 106, and 108. Based on the power status of the devices 104, 106, and 108, the processor 122 may devise a power sharing strategy for the device 102.

The devices 102, 104, 106, and 108 may share power based on the devised power sharing strategy. A device may receive power from one or more other devices connected to the network and use the received power to recharge its power storage device. A device may also transmit excess power from its power storage device to one or more other devices connected to the network. In this disclosure, power sharing by a device may imply both receiving power from other devices and transmitting power to other devices. That is, sharing power of a device includes transmitting excess power to other devices connected to the network 140 and receiving power from the other devices connected to the network 140.

For example, if the charge level of the power storage devices 112, 116, and 118 are high and the charge level of the power storage device 114 is low, then this information would be reflected in the power status of the devices 102, 106, and 108. The processor 112 may be aware of device 102's power status and may receive the power status from the other devices. Responsive to the power status of the devices 102, 104, 106, and 108, the processor 112 may devise a power sharing strategy, which would allow the device 102 to deliver a certain amount of power to the device 104, which may be used to recharge the power storage device 114. The devices 106 and 108 may not participate in power sharing (although they may continue communicating their power status) as device 102 may have sufficient excess power to meet the power need of device 104. The The inventive principles are, however, not limited to sharing power between two devices only. A device connected to the network may share power with more than one device. For example, if the power storage device 112 has a high charge level, and power storage devices 116 and 118 have a low charge level, then device 102 may transmit power from the power storage device 112 to the devices 106 and 108, to recharge the power storage devices 116 and 118 respectively. That is, the devices 102, 106, and 108 may share power.

As disclosed before, the power status of a device may include several parameters. A processor may devise a power sharing strategy based on some or all of these parameters. A power sharing strategy may also include the amount of power a device wants to share. If a device shares power with at least two other devices, the power sharing strategy may also include the amount of power the device wants to share with each of the at least two other devices. The power sharing strategy may additionally include the duration of time a device wants to share power, a start time and/or an end time of power sharing. The power sharing strategy may also include any additional factors, as should be apparent to those skilled in the art.

The devices 102, 104, 106, and 108 connected to the network 140 may also negotiate with each other while devising their power sharing strategy. For example, when one device may only transmit a limited amount of power to two other devices, then the devices may negotiate such that each of the two other devices receive a certain percentage of the limited amount of power available from the one device. For example, if the device 102 has excess power and the devices 104 and 106 are in need of power, then device 102 may be willing to transmit 5% of it total power. The devices 102, 104, and 106 may negotiate while devising their power sharing strategy and as a result of the negotiations, device 104 may receive 2% of device 102's power and device 106 may receive the remaining 3% of device 102's power. The amount of power shared may be decided during a negotiation among the devices. There may be several other situations during which the devices may negotiate. For example, if a device realizes that several other devices need power from the device, then the device may transmit more power than it would transmit if only one other device was in need of power. That is, for example, say device 102 is fully charged and any one device (say device 104) needs power. The device 102 may then agree to transmit 3% of its power to device 104. However, if two devices (say device 104 and 106) are in need of power, then the device 102 may agree to transmit 5% of its power to the two devices. There may be numerous other situations when the devices may engage in negotiations, as should be apparent to those skilled in the art. A first device may, for example, decide not to transmit its excess power to a second device; a third device may instead transmit its excess power to the second device. That is, a device may decide to selectively share its power.

The negotiation may be based on several factors, including power requirement of the devices, available power, power rating and power consumption of the devices, importance of the devices to the user, any other parameter included in the power status or any other suitable factor.

For example, assume that the devices 102, 104, 106, and 108 are a laptop, a cellular phone, a digital camera, and a MP3 player, respectively. Each of these devices may be aware of the power status of other devices based on a communication of power status through the network 140.

During a first situation, if the MP3 player 108 has little power and the other three devices have sufficient power, then only the laptop 102 may share power with the MP3 player 108, i.e., transmit power to the MP3 player 108 to recharge the power storage device 118 included in the MP3 player 108. The laptop 102 may decide to transmit only a certain percentage of its stored power (say 1%) to the MP3 player 108. The cellular phone 104 and the digital camera 106 may not participate in power sharing; instead they may only communicate power statues.

During a second situation, if the laptop 102 has full power and the other three devices have little or no power, then the devices may negotiate and devise appropriate power sharing strategies. Based on the power sharing strategies, the laptop 102 may only share a certain percentage (say 5%) of it power with the other devices. This power may not be sufficient to fully charge all the three devices. The laptop 102 may start sharing power with the other three devices. After certain duration of time (say 1.5 hours later), the cellular phone 104 may be recharged to a certain agreed charge limit (decided during negotiation) and may stop accepting power from the laptop. After another certain duration of time (say 0.5 hours later), the MP3 player 108 may be recharged to a certain agreed charge limit (decided during negotiation) and stop accepting power from the laptop 102. The digital camera 106 may keep on accepting power from the laptop 102 till the power available from the laptop (5% of laptop 102's power) is exhausted.

Figure 2:
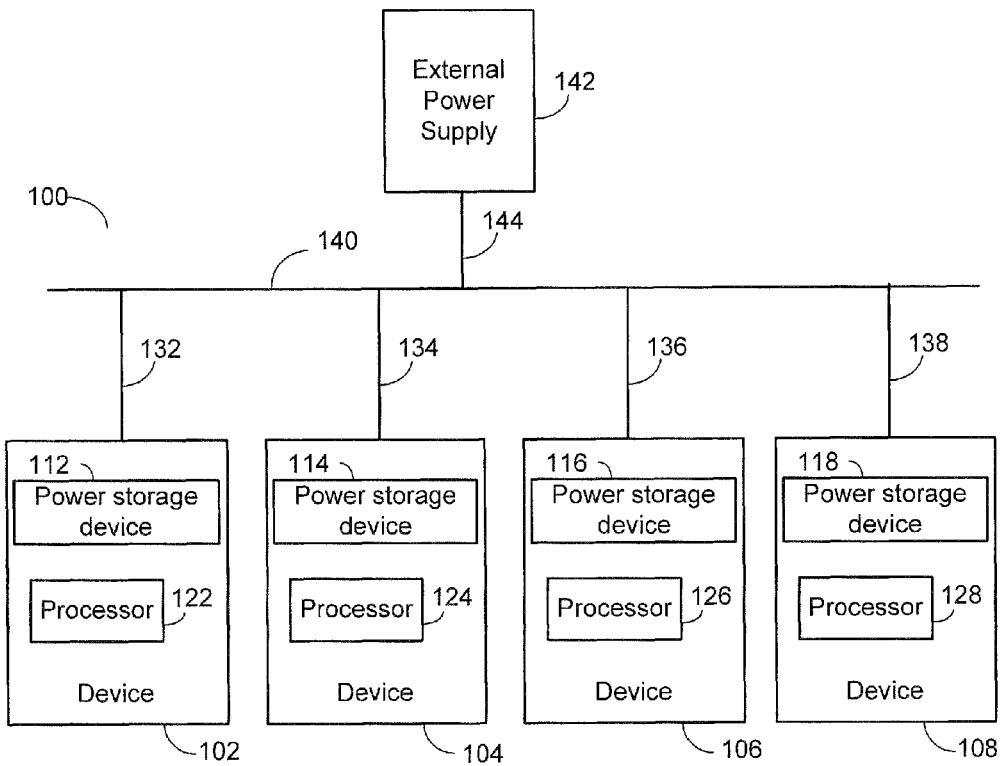
FIG. 2 illustrates an exemplary external power supply connected to the system of FIG. 1.

FIG. 2 illustrates an exemplary external power supply 142 connected to the system 100 of FIG. 1. The external power supply 142 is connected to the network 140 through a link 144. The external power supply 142 may be any suitable power supply which may supply power to the devices 102, 104, 106, and 108. For example, the external power supply may be obtained from an AC/DC adapter. The external power supply may also be a battery, e.g., a car battery. The rating of the external power supply may be sufficient to supply power to all the devices 102, 104, 106, and 108. For example, the current rating of the external power supply 142 may be at least equal or higher than the combined current rating of the devices 102, 104, 106, and 108. The external power supply 142 may supply power and recharge the power storage device of all the devices 102, 104, 106, and 108. That is, a single external power supply may power all the devices connected to the network 140.

When the external power supply 142 is available, the devices may be powered and recharged using power from the external power supply. In absence of such an external power supply 142, the devices may share power as explained with reference to FIG. 1. In an embodiment, some of the devices may receive power from the external power supply as well as share power. For example, if the external power supply does not have sufficient power for all the four devices, it may partially power some of the devices. In that case, the rest of the devices may share power.

Figure 3:
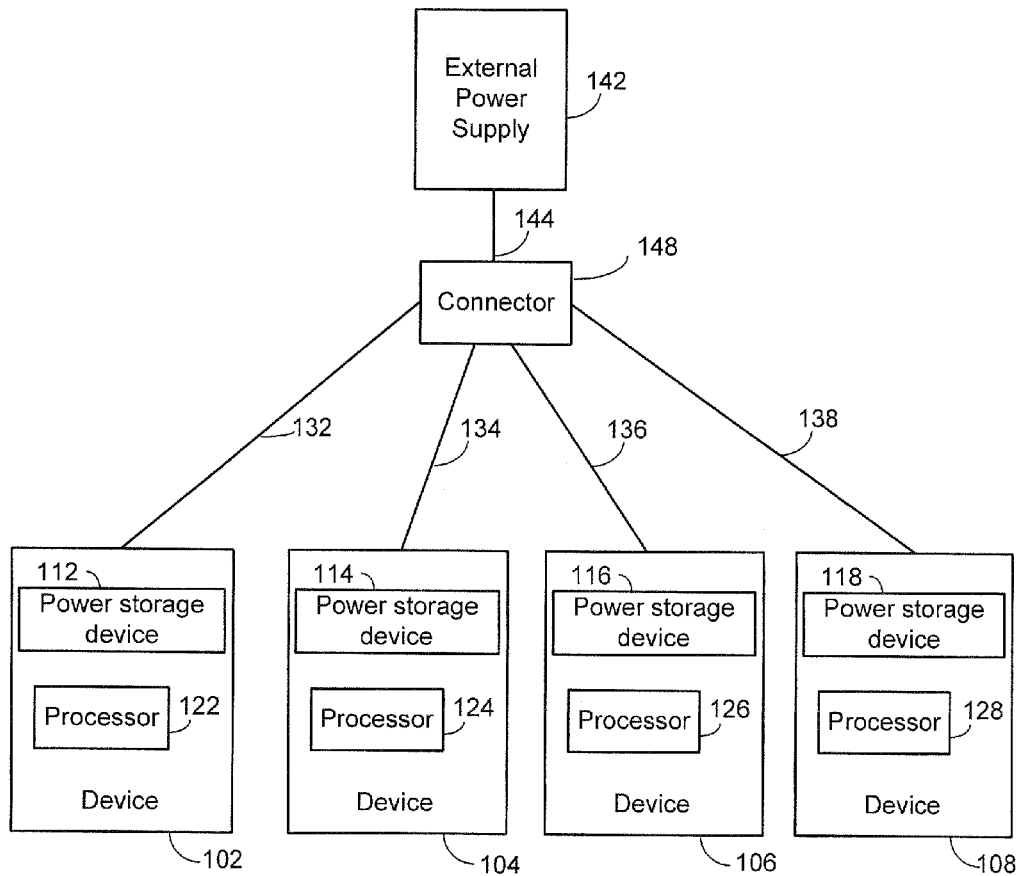
FIG. 3 illustrates an exemplary external power supply connected to the system of FIG. 1.

FIG. 3 illustrates an alternate embodiment of the system 100 of FIG. 2. In FIG. 3, the devices 102, 104, 106, 108 and the external power supply 142 are connected to a connector 148. That is, the connector 148 of FIG. 3 acts as the network 140 of FIG. 2. The connector 148 may have multiple ports. One of the ports may accept the external power supply 142 through link 144. The remaining ports may be used to connect devices 102, 104, 106, and 108. It should be apparent to those skilled in the art that although the connector 148 is shown with 5 ports, it may have any different number of ports.

Figure 4:
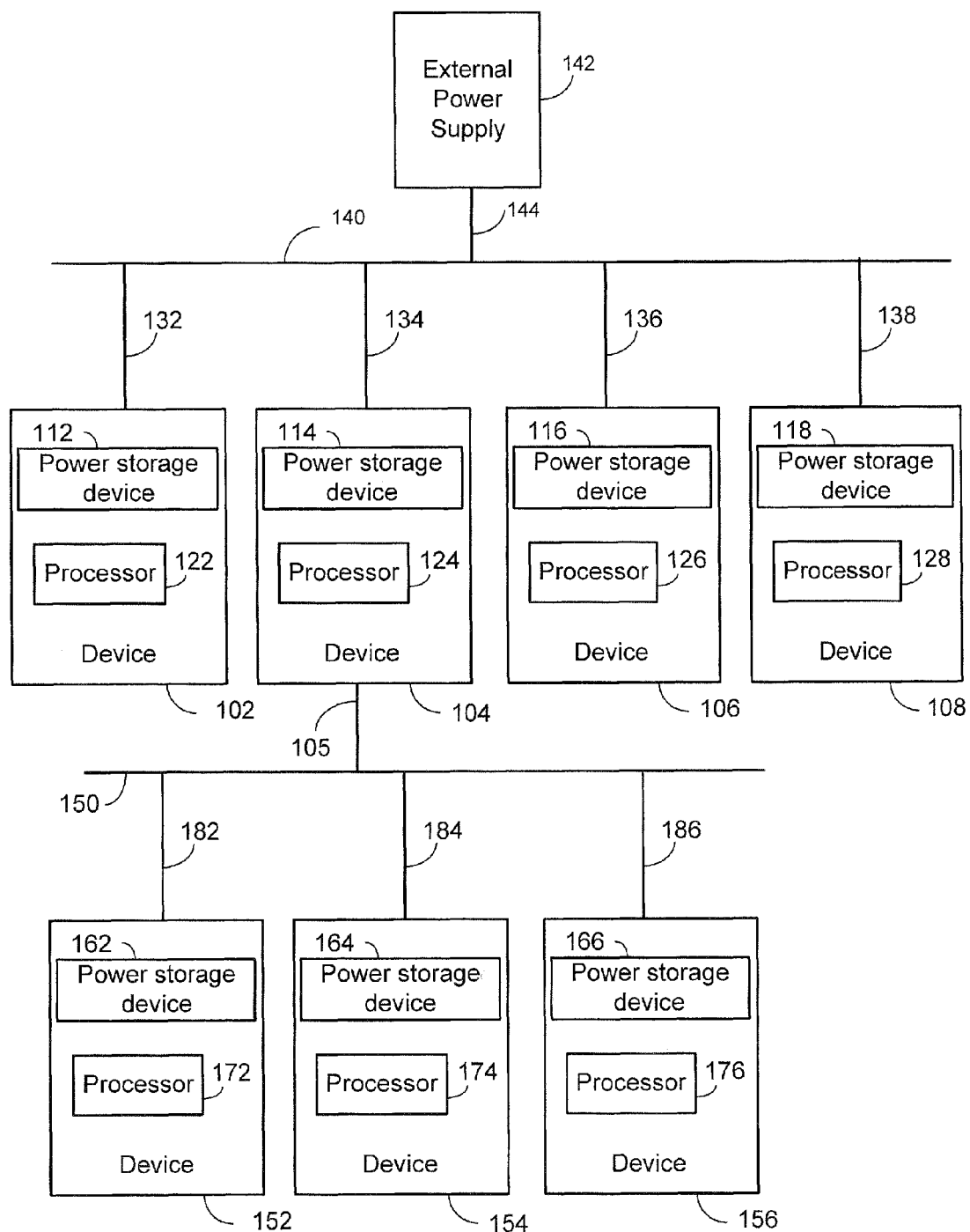
FIG. 4 illustrates the exemplary system of FIG. 2, with a secondary network of devices.

FIG. 4 illustrates the system of FIG. 2, with a secondary network of devices. Referring to FIG. 4, the device 104 is connected to a secondary network 150 through a link 105. The device 104 may, thus, be connected to both the network 140 and the secondary network 150 and may share power with other devices connected to both the networks 140 and 150. The device 104, for example, may be a laptop. In that case, the laptop 104 may have two ports to share power: one with devices in the network 140 and the other with devices in the secondary network 150. It should be apparent to those skilled in the art that any one of the devices 102, 104, 106, and 108 (and not particularly 104) may be connected to both the networks 140 and 150. Alternatively, more than one of the devices 102, 104, 106, and 108 may be connected to both the networks.

A plurality of other devices 152, 154, and 156 are also connected to the secondary network 150 through links 182, 184, and 186 respectively. The devices 152, 154, and 156 may include power storage devices 162, 164, and 166 respectively. The devices 152, 154, and 156 may also include processor 172, 174, and 176 respectively.

The secondary network 150 and devices 152, 154, and 156 may function similar to the network and devices of FIG. 1. That is, devices 104, 182, 184, and 186 may share power through the secondary network 150. In an embodiment, an external power supply (not shown), similar to the external power supply 142 of FIG. 2, may be connected to the secondary network 150. A connector (not shown), similar to the connector 148 of FIG. 3, may be used for the secondary network 150.

When a device is connected to both the networks 140 and 150, the device may share power with other devices connected to both the networks 140 and 150. In that case, the device may have to perform additional negotiations to devise an appropriate power sharing strategy to share power.

Figure 5:
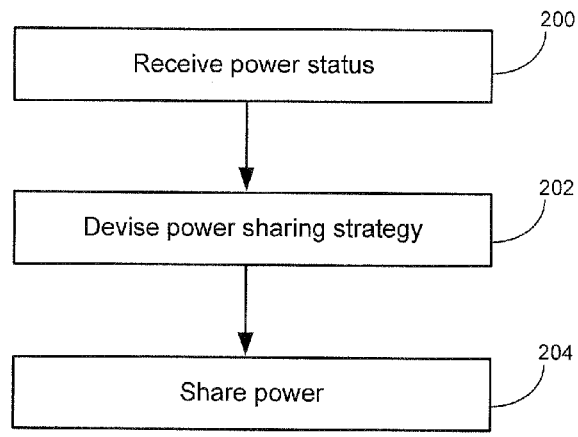
FIG. 5 illustrates an example flowchart of a power sharing method.

FIG. 5 illustrates an example flowchart of a power sharing method associated with the systems of FIGS. 1-3. Referring to FIGS. 1-3 and FIG. 5, at 200, each of the devices 102, 104, 106, 108 receives power status from the other devices connected to the network 140. As disclosed before, the power status of a device may include a variety of parameters associated with the device. Responsive to the power status, one or more devices may devise a power sharing strategy at 202. As disclosed before, various factors may be taken into account while devising the power strategy and the devices may negotiate with each other while devising the power strategy. Responsive to the power strategy, the devices 102, 104, 106, 108 may share power at 204.

It should be apparent to those skilled in the art that the method of FIG. 5 may also be applied to receive power status, devise power sharing strategy and share power among devices 104, 152, 154, and 156 connected to the secondary network 150 of FIG. 4.

We describe embodiments with reference to the drawings. Various other embodiments are also possible and practical. The embodiments should not be construed as being limited to the examples we set forth above.

The system we describe above can use dedicated processor systems, micro controllers, programmable logic devices, or microprocessors that perform some or all of the operations. Some of the operations described above may be implemented in software and other operations may be implemented in hardware or a combination of both software and hardware.

For the sake of convenience, we have described the operations as various interconnected functional blocks or distinct software modules. This is not necessary, however, and there may be cases where these functional blocks or modules are equivalently aggregated into a single logic device, program, or operation with unclear boundaries. In any event, the functional blocks and software modules or features of the flexible interface can be implemented by themselves, or in combination with other operations in either hardware or software.

We claim all modifications and variation coming within the spirit and scope of the following claims.

What is claimed is:

1. A method comprising:
communicating a power status of each of a plurality of power-consuming devices to all other ones of the plurality of power-consuming devices connected to a network such that each of the plurality of power-consuming devices receives the power statuses of all the other ones of the plurality of power-consuming devices, wherein the plurality of power-consuming devices includes at least three power-consuming devices, a first device of the at least three power-consuming devices configured to provide power to other devices of the at least three power-consuming devices responsive to the power statuses of the other devices of the at least three power-consuming devices; and
each processing portion of each of the plurality of power-consuming devices devising a power strategy plan to negotiate sharing power between the plurality of power-consuming devices responsive to the communicating;
wherein:
devising the power strategy plan includes when the first device of the at least three power-consuming devices has an excess amount of power and is designated to transmit a limited amount of the excess amount of power to charge two or more devices of the at least three power-consuming devices, negotiating a power sharing strategy between the two or more devices such that each of a second device and a third device receives a certain percentage of the limited amount of the excess amount of power.

2. The method of claim 1 where communicating the power status of each of the plurality of power-consuming devices includes communicating a charge level of each of the plurality of power-consuming devices and where sharing power is responsive to a request from one of the plurality of power-consuming devices.

3. The method of claim 2 comprising:
connecting an external power supply to the network; and
recharging each power-consuming device of the plurality of power-consuming devices using the external power supply responsive to the communicating the charge level.

4. The method of claim 1 where communicating the power status of each of the plurality of power-consuming devices includes communicating a power requirement of each of the plurality of power-consuming devices.

5. The method of claim 1 where sharing power includes sharing power for a duration of time responsive to the devising the power sharing strategy.

6. A system comprising:
a first power-consuming device including a first power storage device;
a second power-consuming device including a second power storage device; and
a third power-consuming device including a third power storage device;
where the first and the second power-consuming devices are configured to communicate a power status of the first and the second power-consuming devices to the third power-consuming device;

where the first and the third power-consuming devices are configured to communicate a power status of the first and third power-consuming devices to the second power-consuming device;

where the second and the third power-consuming devices are configured to communicate the power status of the second and the third power-consuming devices to the first power-consuming devices;

where the first power-consuming device is configured to provide power from the first storage device to one or more of the second storage device and the third storage device responsive to the power statuses of the first, the second, and the third power-consuming devices; and each of the first, the second, and the third power-consuming devices are configured to devise a power strategy plan to negotiate sharing power when the first power-consuming device has an excess amount of power and is designated to transmit a limited amount of the excess amount of power to charge the second power-consuming device and the third power-consuming device, the second power-consuming device and the third power-consuming device configured to negotiate a power sharing strategy such that each of the second power-consuming device and the third power-consuming device receives a certain percentage of the limited amount of the excess amount of power.

7. The system of claim 6
where the first power-consuming device is configured to provide a first amount of power to the second storage device and a second amount of power to the third storage device; and where the first power-consuming device is configured to determine the first amount of power and the second amount of power responsive to the power statuses of the first, the second, and the third power-consuming devices.

8. The system of claim 6 comprising an external power supply configured to provide power simultaneously to the first and the second power-consuming devices.

9. The system of claim 8 where the external power supply is connected to only one of the first, the second, or the third power-consuming device, or a link connecting the first and the second power-consuming devices, a link connecting the second and the third power-consuming devices, or a link connecting the first and the third power-consuming devices.

10. A system for use with a network, the system comprising:
three or more power-consuming devices each comprising a processing portion configured to:
receive a power status of each power-consuming device of the three or more power-consuming devices connected to the network;
devise a power sharing strategy to negotiate sharing power responsive to the power status of each power-consuming device of the three or more power-consuming devices; and
share power with at least one other of the power-consuming devices connected to the network responsive to the power sharing strategy, wherein
when a first power-consuming device has an excess amount of power and is designated to transmit a limited amount of the excess amount of power to charge two or more of the three or more power-consuming devices, the processing portions of each of a second and a third power-consuming devices devise a power sharing strategy between the second power-consuming device and the third power-consuming device such that each of the second power-consuming device and the third power-consuming device receives a certain percentage of the limited amount of the excess amount of power.

11. The system of claim 10 where the power sharing strategy includes devising the amount of power each power-consuming device of the power-consuming devices shares with the at least one other of the power-consuming devices.

12. The system of claim 10 where the power sharing strategy ensures that a charge level of each of the power-consuming devices do not fall below a threshold value.

13. The system of claim 10 where the power sharing strategy ensures that each of the power-consuming devices have substantially sufficient power to operate.

14. The system of claim 10 where a single external power supply connected to the network supplies power to each of the power-consuming devices.

15. The system of claim 10 comprising an external power supply configured to provide power simultaneously to each of the power-consuming devices.

* * * * *